(12) United States Patent
Judd

(10) Patent No.: US 9,342,423 B2
(45) Date of Patent: May 17, 2016

(54) SELECTIVE RESTORATION OF DATA FROM NON-VOLATILE STORAGE TO VOLATILE MEMORY

(71) Applicant: International Business Machines Corporation, Armonk, NY (US)

(72) Inventor: Ian D. Judd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 14/164,372

(22) Filed: Jan. 27, 2014

(65) Prior Publication Data

US 2014/0215277 A1 Jul. 31, 2014

(30) Foreign Application Priority Data

Jan. 29, 2013 (GB) .................................. 1301504.5

(51) Int. Cl.
*G06F 11/00* (2006.01)
*G06F 11/22* (2006.01)
*G06F 11/14* (2006.01)
*G06F 11/20* (2006.01)

(52) U.S. Cl.
CPC ........ *G06F 11/2284* (2013.01); *G06F 11/1441* (2013.01); *G06F 11/2015* (2013.01)

(58) Field of Classification Search
CPC .................................................. G06F 11/2284

USPC ............................................ 714/15, 16, 20, 2
See application file for complete search history.

(56) References Cited

U.S. PATENT DOCUMENTS

| 7,990,797 B2 | 8/2011 | Moshayedi et al. | |
|---|---|---|---|
| 8,169,839 B2 * | 5/2012 | Moshayedi et al. | ........ 365/189.2 |
| 8,200,885 B2 | 6/2012 | Sartore | |
| 8,200,929 B1 * | 6/2012 | Sartore | .......................... 711/162 |
| 2006/0139069 A1 * | 6/2006 | Frank et al. | .................... 327/143 |
| 2012/0131253 A1 | 5/2012 | McKnight et al. | |
| 2012/0159045 A1 * | 6/2012 | Hinkle et al. | .................. 711/103 |

FOREIGN PATENT DOCUMENTS

| EP | 0790558 A1 | 8/1997 |
|---|---|---|
| WO | 2012049705 A1 | 4/2012 |

* cited by examiner

*Primary Examiner* — Dieu-Minh Le
(74) *Attorney, Agent, or Firm* — Matthew C. Zehrer

(57) ABSTRACT

A method of controlling data transfers between a volatile memory and a non-volatile storage, the volatile memory being on a memory device operatively coupled to a computer system, the data transfers comprising: storing data from the volatile memory to the non-volatile storage when a power source of the computer system fails, the method comprising following re-establishment of the previously failed power source, the step of: selectively restoring data from the non-volatile storage to the volatile memory by a controller software after restart operations.

17 Claims, 7 Drawing Sheets

Query memory device to verify that it completed the dump successfully

Repeat:
    Read each page of dump from storage into memory
    If Signature == unique pattern:
        Exit Repeat:
    For each Owner/Descriptor pair in current page of page table
        If Owner ~= Null:
            Read corresponding data page from storage into memory
            Call owning function to process Descriptor and restored data
    If Link == Null:
        Exit
    Else read linked page into memory Arm the memory device to enable the next dump

FIG.7

SELECTIVE RESTORATION OF DATA FROM NON-VOLATILE STORAGE TO VOLATILE MEMORY

FIELD OF THE INVENTION

The present invention relates to methods and apparatus for controlling reliable storing of data, including backing-up data from volatile memory to non-volatile storage upon power failure, and restoring data selectively from the non-volatile storage to the volatile memory when power is re-established. Aspects of the invention provide a controller for initiating a backup operation, a memory device and a computer system enabling efficient interaction between control components, volatile memory and non-volatile storage.

BACKGROUND OF THE INVENTION

In the data storage field, many storage controllers contain a mechanism to back up data from a volatile memory to a non-volatile storage when a primary power source fails. The primary power source is typically a main utility power source. Subsequently, when the primary power source returns, the data is restored from the non-volatile storage to the volatile memory. Herein, the term "backup" indicates that availability of data of the volatile memory is maintained by storing the data into the non-volatile storage. The term "restoring data" means that the backed up data of the non-volatile storage is stored into the volatile memory. Typically, the volatile memory retains information or data as long as the power source is applied, but when the power source is off or interrupted the stored data is lost from volatile memory. In contrast, the non-volatile storage does not require a maintained power source to retain data persistently. It is known to selectively back up important data and/or applications that should not be lost upon power failure. These data are also referred to as "persistent data" in the present description.

Many computer systems (e.g., servers or workstations) make use of volatile memory such as Dynamic Random Access Memory (DRAM) to hold operating instructions and data, and include a large amount of non-volatile storage in hard disk drives. Non-volatile storage can also be provided by flash memory. Standard servers are often used as the platform for storage controllers, such as the IBM® System Storage SAN Volume Controller (SVC) product, the IBM Storwize V7000 storage system and the IBM® System Storage DS 8000® family of products from IBM Corporation.

In those data storage products, controller software is required to store data into a non-volatile storage when a primary source powering the storage product fails. The controller software often requires several Gigabytes of such non-volatile storage to preserve the data persistently when the power source has failed; for example, to implement a write cache or to store metadata such as copy services bit maps.

Non-Volatile Dual-Inline Memory Modules (NV-DIMMs) are emerging as a new technology for storage systems, which address the need to preserve persistent data when the primary power source fails. These Non-Volatile DIMMs are generally intended for use as main memory when installed in computer systems such as servers and workstations, and they behave like DRAM in normal operation. In DIMM technology, random access memory modules are mounted in line on a circuit board, with electrical contacts provided on each side of the modules (e.g., 240 pins). In Non-Volatile DIMMs, the random access memory modules such as DRAM modules are combined with at least one flash memory module, a control chip and a backup power input. For illustrative purposes only, an exemplary structure of a Non-Volatile DIMM is shown in FIG. 1.

Several types of DIMMs are available. Most servers use unbuffered DIMMs (UDIMMs) or Registered DIMMs (RDIMMs), but Fully Buffered Double Data Rate Synchronous DRAM Dual In-line Memory Modules (DDR SDRAM FB-DIMMs) are also available. The standard specifying the FB-DIMM is evolving and can be consulted as its latest versions are released at the following address: "JEDEC Solid State Technology Association industry standards body; www.jedec.org". In high-end servers, an Advanced Memory Buffer (AMB) can be added to allow more DIMMs to be attached to a CPU. The AMB buffer communicates with a memory controller over a high speed serial interface o provide high throughput.

To aid understanding of how the invention can be applied to solve a problem with DIMMs, FIGS. 1 and 4 of this specification illustrate an exemplary type of Non-Volatile DIMM having a plurality of DRAM modules. However, it will be appreciated that the invention is not limited to the particular type of DIMM shown in these figures. A known Non-Volatile DIMM structure is described with reference to FIG. 1. A known method of operation for backing up data when power fails and for restoring data when power is re-established is described with reference to FIG. 4.

FIG. 1 shows a Non-Volatile DIMM module 1 including non-volatile storage and volatile memory. As illustrated in FIG. 1, a known Non-Volatile DIMM comprises at least one DRAM chip 5, at least one Flash memory chip 2 and a hardware control module 3 (all located on the DIMM's printed circuit board) and a backup power source 4. FIG. 1 illustrates a plurality of DRAM modules 5, each of which comprises a part of the DIMM's DRAM 15. The at least one Flash memory module 2 comprises a Flash memory 12. The DRAM 15 provided by each of the plurality of DRAM modules 5 is part of the volatile memory and the at least one Flash memory 12 constitutes the non-volatile storage. The DRAM modules 5 are each connected to an internal bus 9 via a respective Bus switch 10 and the bus is connected to the control module 3. Signals can be exchanged between the respective DRAM modules 5 and the control module 3 via the bus 9. The at least one Flash memory module 2 is connected to a hardware Flash controller module 6. The control module 3 of the Non-Volatile DIMM is connected to the Flash controller 6 via a standard internal interface; for example, a Serial Advanced Technology Attachment (SATA) interface 8.

The Control module 3 is an initiator, sending read and write commands to the Flash controller 6, and this Flash controller is a target that responds to commands from the control module 3. During normal operation, the Non-Volatile DIMM 1 is powered by a primary power source (not shown on FIG. 1). In the event that the primary power source for the Non-Volatile DIMM 1 fails (step S41), a power control unit 7 identifies the power failure and configures the bus switches 10 to disconnect the DRAM's from the DIMM pins 13 and connect them to bus 9. The backup power source supplies sufficient temporary power to the Non-Volatile DIMM, under control of the power control unit 7, for transferring data from DRAM 15 into the Flash memory 12 (step S42). The control module 3 automatically takes control over the DRAM 15 for dumping the entire content of the DRAM 15 to the Flash memory 12. The control module controls reading of data from DRAM and writing of data to the flash memory 12 in the flash memory module 2 (step S43). This automatic data transfer from volatile memory to non-volatile storage occurs when the primary power source fails and before energy from the backup power source 4 is depleted. This non-selective backup process is often called a "Fire Hose Dump", referring to its transfer of the full contents of the DRAM 15. When the primary power source has failed (step S41), the power provided by the backup power source 4 is originated from an external super-capacitor or from a secondary battery connected thereto. A connection between the secondary battery and the backup power unit 4 can for example be provided by means of a flying lead. In the event that the primary power source is restored (step S44), the control module 3 automatically restores the totality of the data stored in the Flash memory 2 to the DRAM 5 (step S45) and the backup power source 4 subsequently recharges (step S46).

Current Non-Volatile DIMMs make use of the Flash controller module 6 to manage wear levelling and bad blocks in the Flash memory. Wear levelling is a process for extending the lifespan of non-volatile storage such as Flash memory or solid state disks. As each block can tolerate a finite number of write/erase cycles before becoming unreliable, wear leveling arranges for the number of write/erase cycles to be distributed evenly among all of the blocks in the storage. Hence, wear levelling is meant to prevent using the same blocks of storage a significantly greater number of times.

A Non-Volatile DIMM 1 connects to a computer system motherboard (Printed Circuit Board of a server or a workstation) by means of connection pins that are not shown on any figure. Through these pins, data, address and control signals are exchanged with the motherboard. Arrows 13 on FIG. 1 indicate the bidirectional nature of the data input/output pins that are used to transfer data signals between the DIMM and the computer's motherboard during the reading and writing operations.

Non-Volatile DIMMs offer several advantages. The backup power source 4 is connected to provide required power for backup purposes without requiring all components of the computer system (e.g., the server motherboard) to be powered during the "Fire Hose Dump". This significantly reduces the energy and peak current that the backup power source 4 must provide. Moreover, Non-Volatile DIMMs can be directly installed in place of regular DIMMs on the motherboard of a standard computer system (e.g., server) as they have the same form factor and electrical interface. Hence, the Non-Volatile DIMM provides non-volatile memory without making any other change to the system hardware. This contrasts with other means of adding non-volatile memory to a computer system. In general, adding non-volatile storage often involves adding custom hardware to the computer system. In addition, DIMMs provide high-speed, high-density memory for servers, workstations, networking equipment, desktop computers and the like.

Typical Non-Volatile DIMM products are able to restore (step S45) all of the data from non-volatile storage to volatile memory when power is re-established. However, there are some problems with known products. Firstly, the contents of the Non-Volatile DIMM can be over-written during the running of some standard start-up test routines referred to as Power-On Self Test (POST), which take place immediately after the server is powered and are used to check whether the computer's RAM, storage drives, peripheral devices and other hardware components are working properly. Secondly, a standard operating system such as Linux sees the DRAM of the Non-Volatile DIMM 1 as ordinary memory for it to allocate to any process (just like any other memory) and therefore it could overlay some of the data contained therein with other information such as program code during a reboot. Since standard POST diagnostic test routines are handled by the system's BIOS (Basic Input/Output System), one possible solution to avoid the above mentioned problems consists in modifying the operating system and BIOS of the computer system to prevent over-writing storage of the Non-Volatile DIMM whilst the computer system reboots. One problem that could remain is that the step of restoring the contents of Flash memory to DRAM may over-write important data or program code stored in the DRAM 15, if the operating system has used any of the original memory locations before the restore operation. This may cause a system crash.

SUMMARY OF THE INVENTION

The present invention provides methods, apparatus and computer programs for selectively restoring persistent data from non-volatile storage to volatile memory, which mitigates the above-mentioned problems. The invention provides a memory device, a method and a storage controller for initiating and controlling a selective restore operation after the storage controller software restarts upon re-establishment of power following a power failure. The selective restoring of only persistent data allows data to be restored to different memory locations from those it occupied when it was dumped to non-volatile storage, avoiding overwriting memory locations in DRAM that have been used by the operating system during restart. Meanwhile, deferring restore until after POST processing and restart of the storage controller addresses the problem of the POST operations over-writing restored data.

The present invention provides, in a first aspect, a method of controlling data transfers between a volatile memory and a non-volatile storage, the volatile memory being on a memory device operatively coupled to a computer system. The method comprises: storing persistent and non-persistent data from the volatile memory to the non-volatile storage when a primary power source of the computer system fails; and, following re-establishment of a primary power source, selectively restoring only persistent data from the non-volatile storage to the volatile memory after completing POST, booting the operating system and starting the storage software.

For the avoidance of doubt, the terms "including" and "comprising" as used throughout this specification and claims are not to be interpreted narrowly (such as meaning "consisting only of") but are to be construed as not excluding the possibility of other claim elements or steps. The indefinite article "a" or "an" similarly does not exclude a plurality.

In a first embodiment, the selective restore is initiated by a storage controller program that is configured to be one of the first programs to run after the operating system starts. The BIOS automatically starts booting the operating system after the BIOS has completed POST operations, and then the selective restoring of data to volatile memory can be initiated as one of the first operations of a storage controller program that is loaded into system memory by the operating system upon the completion of POST operations. The storage controller software then performs the restore operation. This guarantees that POST operations are completed before the restore operation begins transferring any backed up data to volatile memory.

In one embodiment, following POST operations and before the restoration of data, the storage controller software requests allocation by the operating system of memory space in volatile memory, and the operating system avoids reallocating memory spaces that have already been allocated since commencement of the restart. The operating system allocates sufficient memory space in the volatile memory for restoring persistent data from the non-volatile storage to the volatile memory.

In one embodiment, the memory device is a Non-Volatile DIMM that is controlled by computer program code to perform a selective restore of persistent data. In an embodiment of the invention for use in Non-Volatile DIMMs, a control chip of the DIMM transfers all data to non-volatile Flash storage on the DIMM in response to the power failure, whereas the selective restore is performed by storage controller software running outside the DIMM and this controller software only starts to run after completion of Power-On Self-Test (POST) processing. This avoids the risk of POST processing over-writing restored persistent data, as the backed-up data is still held in non-volatile storage (e.g., Flash memory) when POST runs. Secondly, the operating system will only allocate free memory to the storage controller software during the restart operations. So, when selectively restoring persistent backed-up data from non-volatile storage, all of the data that needs to be restored can be restored to DRAM without overwriting any of the DRAM 15 that has already been used for other information.

This selective restore under the control of storage controller software can be implemented by providing the Flash controller on the Non-Volatile DIMM with a multiplexer that provides an external interface such as a SATA interface for receiving commands from the external storage controller software, and for enabling the storage controller software to read the contents of the Flash memory. The Flash controller may also be connected to the control chip of the DIMM via this port selector's SATA interface, so the port selector provides a backup path via one port and an externally-controlled restore path via a second port.

In an alternative embodiment of the invention, the non-volatile storage is external to the memory device and the memory device is provided with an external interface for connecting said non-volatile storage to the memory device. In particular, the non-volatile storage may be provided by a solid state disk (SSD), which may be a target for the transfer of data from the volatile memory of the memory device, and which SSD may also receive read commands from an external software-implemented controller. The control chip of the memory device is still an initiator for the dump operation as described previously. Having an external non-volatile storage advantageously frees up scarce physical space on a Non-Volatile DIMM or other memory device, which can then be used for inserting additional volatile memory modules (e.g., DRAM modules). The SSD or other external storage may be the same storage that the system uses during its boot, and so the invention can be implemented without substantial additional hardware cost.

The operating system usually divides memory into fixed-size pages (e.g., 4 KB) in order to virtualize the memory. In one embodiment of the invention, the controller software selectively restores the data by reading the non-volatile storage, identifying the persistent data to be restored and writing the identified persistent data into its virtual memory. This can be implemented by reference to a page table which is maintained by the controller software in the memory device during normal operation. Consequently, the memory device automatically dumps the page table to the non-volatile storage when the utility power fails. The page table contains one entry for each page of memory in the Non-Volatile DIMM, arranged in ascending order of the physical page addresses. The page table typically requires tens of Megabytes of memory and so it will occupy multiple memory pages. If the controller software is running in virtual memory, these pages may be scattered anywhere in physical memory. However, the page table always starts on a page boundary.

In one embodiment of the invention, the page table contains the following fields (as shown in FIG. 6):

Signature (16 bytes)—A unique pattern to allow the restore software to locate the start of the page table in the dump.

Owner (2 bytes)—This field identifies the Owning function, e.g., write cache or copy services. It is set to Null if the page does not contain persistent data.

Descriptor (14 bytes)—Metadata used by the owning function, e.g., for the write cache function this field might contain the virtual disk number and block offset.

Link (8 bytes)—The physical page number of the next page of the page table or Null if this is the last page.

The storage controller's write cache and persistent metadata must be preserved, but it is not necessary to restore "dumped" program code (as this is reloaded by the operating system) or the controller's read cache (as this is merely a copy of data that is held elsewhere).

The memory device and the accompanying storage controller software according to one embodiment of the invention avoid the need to make any modifications to either an operating system, or a Basic Input/Output System (BIOS) or other firmware running on the computer system (e.g., the server).

In one embodiment, the memory device is a Non-Volatile Dual In-line Memory Module.

In one embodiment, the non-volatile storage includes at least a Flash memory module.

In one embodiment, the non-volatile storage includes a solid state disk (SSD).

In one embodiment, the volatile memory includes at least one Dynamic Random Access Memory module.

In one embodiment, the external interface includes a Serial Attached SCSI (SAS) interface. A Serial Attached Small Computer System Interface (SAS) is suitable for connecting an external storage to the memory device. Advantageously, the SAS storage has dual ports, which avoids the need for a multiplexer.

A data processing apparatus according to one aspect of the invention comprises one or more memory devices that are Non-Volatile Dual In Line Memory Modules, and optionally one or more memory devices that are volatile Dual In Line Memory Modules, and wherein the controller software firstly reserves as much memory space as it can and then releases any volatile memory that is not on a non-volatile DIMM and which it does not need. The distinction between the two classes of memory can be based on the physical memory addresses; e.g., by assuming that the Non-Volatile DIMM(s) have a known capacity and they have been installed starting at physical address 0.

In another aspect of the invention, there is provided a memory device capable of being coupled to a computer system for operating therewith. The memory device comprises volatile memory and is capable of transferring data between the volatile memory and non-volatile storage, such that data from the volatile memory is transferred to the non-volatile storage when a primary power source of the computer system fails. The memory device is controlled by storage controller software for selectively restoring data from the non-volatile storage into memory when the controller software restarts after re-establishment of a primary power source. The memory device may also have the non-volatile storage thereon.

The memory device may have an external interface for connecting the memory device to an external non-volatile storage, and for transferring data between the volatile memory and the external non-volatile storage.

The memory device may have a multiplexer for connecting a control module of the memory device, a controller of the non-volatile memory and an initiator port of the computer system. In one embodiment, the multiplexer is a Serial Advanced Technology Attachment (SATA) port selector.

In a further aspect of the invention, there is provided a computer system comprising: a memory device having a volatile memory; a non-volatile storage; and means for controlling data transfers between the non-volatile storage and the volatile memory according to the steps of one of the above-described methods.

In a further aspect of the invention, there is provided a computer program product for controlling data transfers between volatile memory of a memory device operatively coupled with a computer system, and non-volatile storage, wherein the computer program product comprises a computer-readable storage medium having computer-readable program code recorded thereon, the computer-readable program code being adapted to cause a data processing apparatus to carry out the steps of one of the above-described methods.

In a further aspect of the invention, there is provided a computer program comprising program code instructions for implementing one of the above-described methods.

As noted above, aspects of the present invention may be embodied as a method, a memory device, a computer program product, a computer program, or a system. Aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Aspects of the present invention are described below with reference to Figures including block diagrams showing methods, devices/apparatus (systems) and computer program products according to embodiments of the invention. It will be understood that each block of the block diagrams, and combinations of blocks in the block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

The block diagrams in the Figures illustrate the functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams can be implemented by special purpose hardware-based systems that perform the specified functions or acts, or combinations of special purpose hardware and computer instructions.

BRIEF DESCRIPTION OF THE DRAWINGS

Embodiments of the present invention will now be described, by way of example only, with reference to the following figures in which:

FIG. 7 contains pseudo-code for a restore process according to an embodiment of the invention.

DETAILED DESCRIPTION OF THE EMBODIMENTS

Embodiments of this invention provide new types of Dual-Inline Memory Modules (DIMMs) which include an external disk interface and connections for use in the control of restore operations. In different embodiments of the invention, the external disk interface may be used in a target mode or an initiator mode, as described below. A DIMM according to an embodiment of the invention may have a conventional number of connection pins (e.g., 240 pins) but with one or more external connections, such as flying lead connections, for integration with external storage hardware and/or storage controller software. Alternatively the additional connections can be implemented via currently unused pins or extra pins on the DIMM. The external disk interface can be of various types including a Serial Advanced Technology Attachment (SATA) interface or a Serial Attached Small Computer System Interface (SAS). High speed serial interfaces such as SATA and SAS are preferred in order to keep the flying lead as thin as possible and minimise the energy required from the backup power source. Ideally the interface should also be compatible with commodity storage devices.

SATA is an Integrated Drive Electronics (IDE) standard for cables and connectors for connecting devices such as hard drives or disks to a motherboard. A SATA connection generally consists of a cable whose first end is plugged to the motherboard of the computer system (e.g., server) and whose other end is plugged into the device (e.g., a Non-Volatile DIMM). Serial-attached SCSI (SAS) is a standard method and interface used in accessing computer peripheral devices. The method is specified in the standard called Serial-attached SCSI (Small Computer System Interface), also known as ANSI/INCITS 376-2003. Serial Attached SCSI is especially of interest for accessing storage devices, particularly external disks.

The external disk interface of the DIMM may receive commands from the control chip 3 of the DIMM when power fails, for backing up data from the volatile memory (e.g., DRAM) to a non-volatile storage (e.g., internal Flash memory of the DIMM or an external Solid State Disk (SSD)). In addition, the external disk interface can be used in target mode to receive commands from an external storage controller program to selectively restore data from the non-volatile storage to the volatile memory (e.g., DRAM) when power is restored. In another embodiment, an external disk interface can be provided for use in initiator mode so that commands from the control chip of the DIMM cause a transfer of data from non-volatile storage to volatile DRAM. Various embodiments of the invention are described below.

Figure 2:
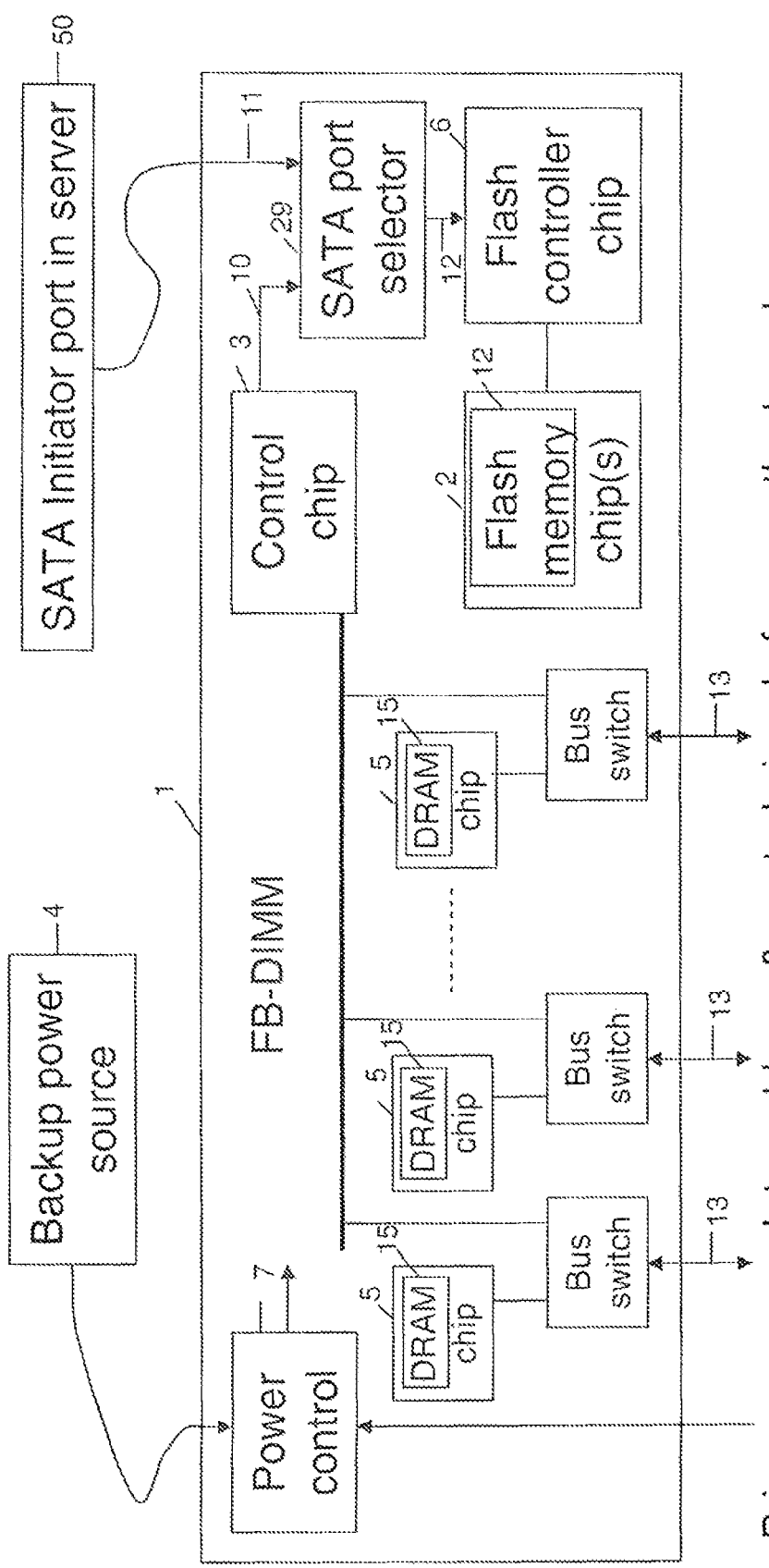
FIG. 2 shows a modified Non-Volatile DIMM with a target-mode disk interface.

FIG. 2 shows a modified Non-Volatile DIMM 1 according to one embodiment of the invention. The non-volatile memory is mainly provided by the Flash memory module 2 of the Non-Volatile DIMM 1. The Non-Volatile DIMM 1 according to this embodiment is provided with a Flash controller 6 whose functions have briefly been explained above. In this embodiment, the non-volatile storage (e.g., the Flash memory 12) is internal to the Non-Volatile DIMM 1. The DRAM 15 constitutes the volatile memory on the Non-Volatile DIMM 1. As illustrated in FIG. 2, the modified Non-Volatile DIMM 1 includes an external disk interface provided by a SATA port selector 29 that is added between the Flash Controller 6 and the Control module 3. The Control module 3 connects to a first input 10 of said SATA port selector 29 and a second input 11 of said SATA port selector 29 is connected to a standard SATA initiator port in the server 50, to allow commands to be provided from the server 50 to the Non-Volatile DIMM via the port selector. The output of said SATA port selector 29 is input in the Flash controller 6. Hence, by virtue of the functioning of a port selector, one of the signals from the Control module 3 or the server 11 is input in the Flash controller 6. The port selector can be controlled by an inband SATA signal; i.e., a protocol sequence from whichever initiator requires access to the device (only one initiator can be active at a time). During the dump and in normal operation the control chip instructs the port selector to connect it to the Flash controller. During the restore process the storage software instructs the port selector to connect the server to the Flash controller.

Figure 5:
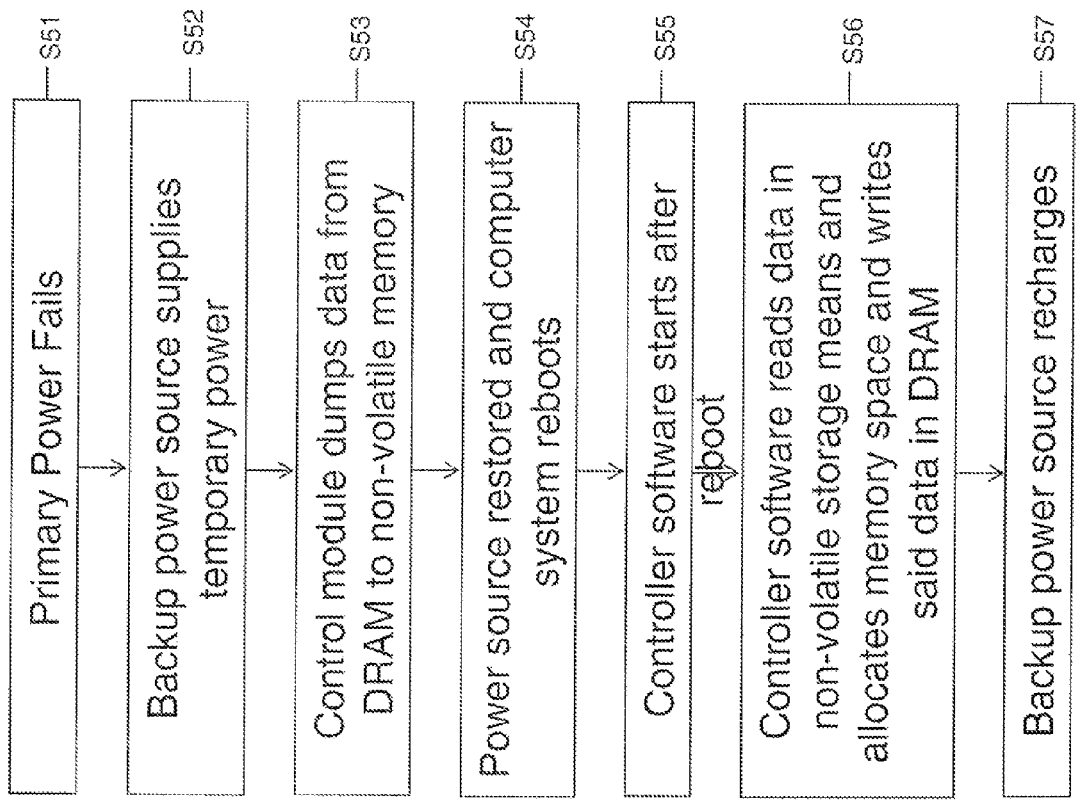
FIG. 5 shows a block diagram of operations according to embodiments of the invention.

The following now describes the method illustrated in the block diagram of FIG. 5 according to this embodiment. When the primary power of the computer system fails (S51), the backup power source supplies power for a short period (step S52) and the control module 3 stores the complete contents of the DRAM 15 to the Flash memory 12 (step S53). When power is restored, the computer system reboots (step S54). After reboot of the operating system, a storage controller program starts. Acting as an initiator, this storage controller program reads the data backed up to the non-volatile storage, allocates memory space in the volatile memory and writes said read data into the DRAM 15 (step S56). According to this embodiment of the present invention, hardware of the Non-Volatile DIMM controls the backup of data to non-volatile storage but it is the controller software which restores the data backed up into the DRAM 15. This differentiates from known Non-Volatile DIMMs in which the Control Module 3 would be responsible for backup and restore operations. Finally, the backup power source recharges (S57). Embodiments of this invention advantageously provide that routines such as Power-On Self Test (POST) routines run during step S54 before the controller software actually starts in step S55. At the time of running the POST routines, the backed up data is still kept persistently in the non-volatile storage (e.g., Flash memory). Hence, the controller software restores the contents dumped into the non-volatile storage (e.g., Flash memory 2) to the DRAM 15 (step S56) after the POST routines have run (in step S54). Therefore, there is no risk that the running of restart routines (e.g., the POST routines, which occur immediately after the restart of the server) will cause data to be over-written within the DRAM 15 of the Non-Volatile DIMM 1. The storage controller does not 'arm' (enable) the Non-Volatile DIMM to perform another dump until all persistent data has been restored to memory, and the backup power source needs to have charged sufficiently to complete another dump operation. This step and checking whether a dump was completed successfully prior to the restore process, can be performed via the I2C interface that is already present on existing DIMMs.

Figure 6:
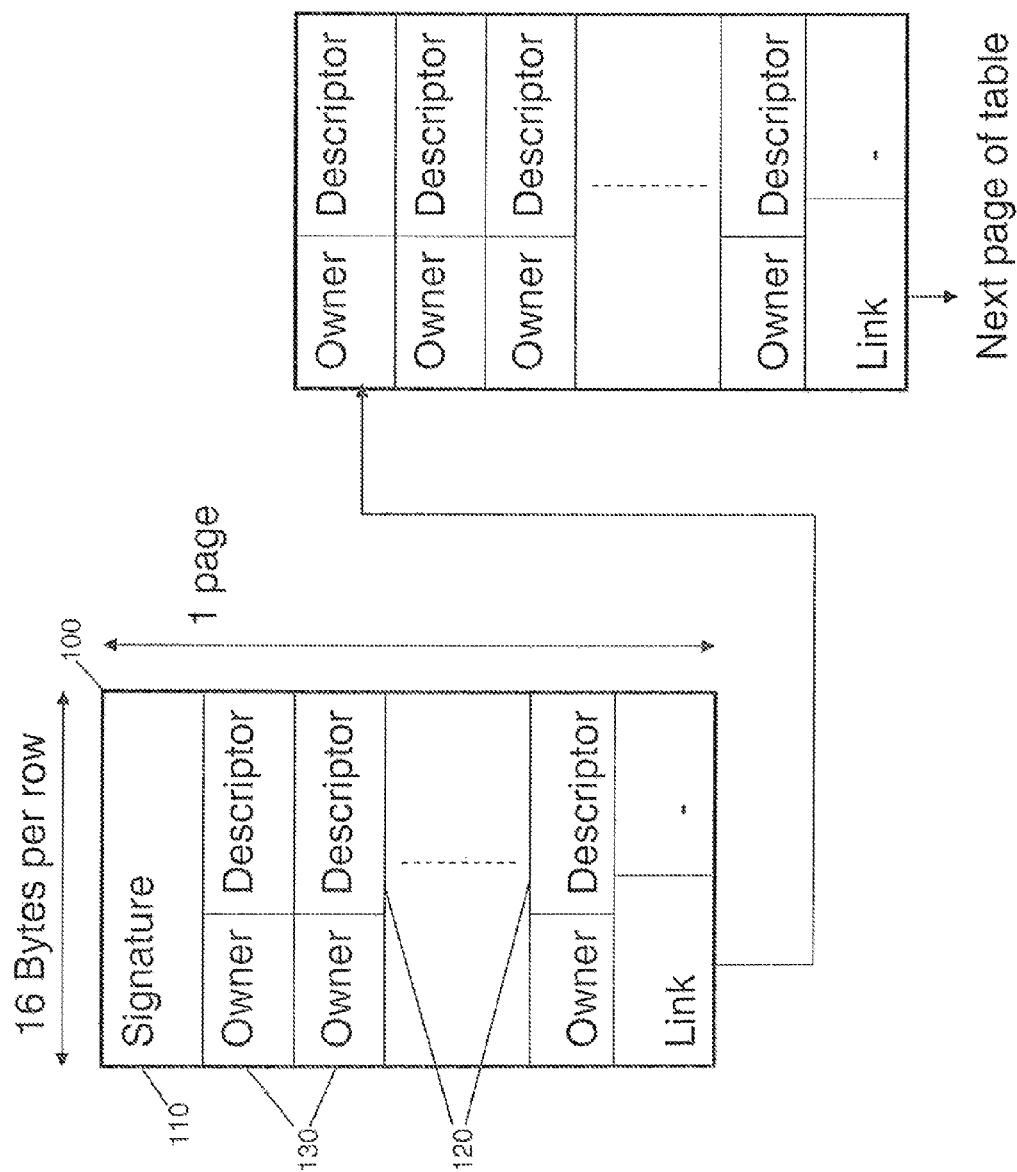
FIG. 6 shows an example format for a page table which identifies those physical memory pages containing persistent data.

By selectively restoring only the persistent data rather than the total backed up data held in the Flash memory 2, it is possible to avoid overwriting whatever small portion of the DRAM has been used by the operating system to store other information during restart. This is achieved by reference to a page table that identifies the addresses of hardened pages within the non-volatile storage. The operating system will only allocate memory that is not already being used, when allocating memory to the controller software. The page table is part of the metadata that was dumped to the non-volatile storage during the data backup that followed failure of the primary power source. An identifiable pattern or 'signature' prefix (or in other embodiments, a pointer at a fixed address) can be used for locating the page table, and the table entries correspond 1:1 with the physical memory pages. These are typically 4 kB units of data. Thus, the table and hardened pages can be at any location in memory, and the invention is able to rely on a known method of 'flagging' persistent data to determine which pages of data need to be restored. This is shown in FIGS. 6 and 7, in which table 100 comprises a prefixed 'signature' field 110 for holding a unique 16 byte pattern for easy identification of the table, and a set of data fields including an 'owner' field (2 bytes) 130 identifying the owning function and a 'descriptor' field (14 bytes) 120 holding metadata used by the owning function (such as virtual disk number and block offset in the case of write cache). Each page ends with a link (8 bytes) providing the physical page number of the next page of the page table (or Null if this is the last page).

The storage software does not 'arm' the Non-Volatile DIMM to perform another dump until it has restored all of the persistent data to memory and the backup power source has recharged sufficiently to complete another dump.

The invention according to the above-described embodiment advantageously avoids the need to make any modifications to either the operating system, or the server BIOS or other firmware running on the computer system (e.g., the server).

Figure 1:
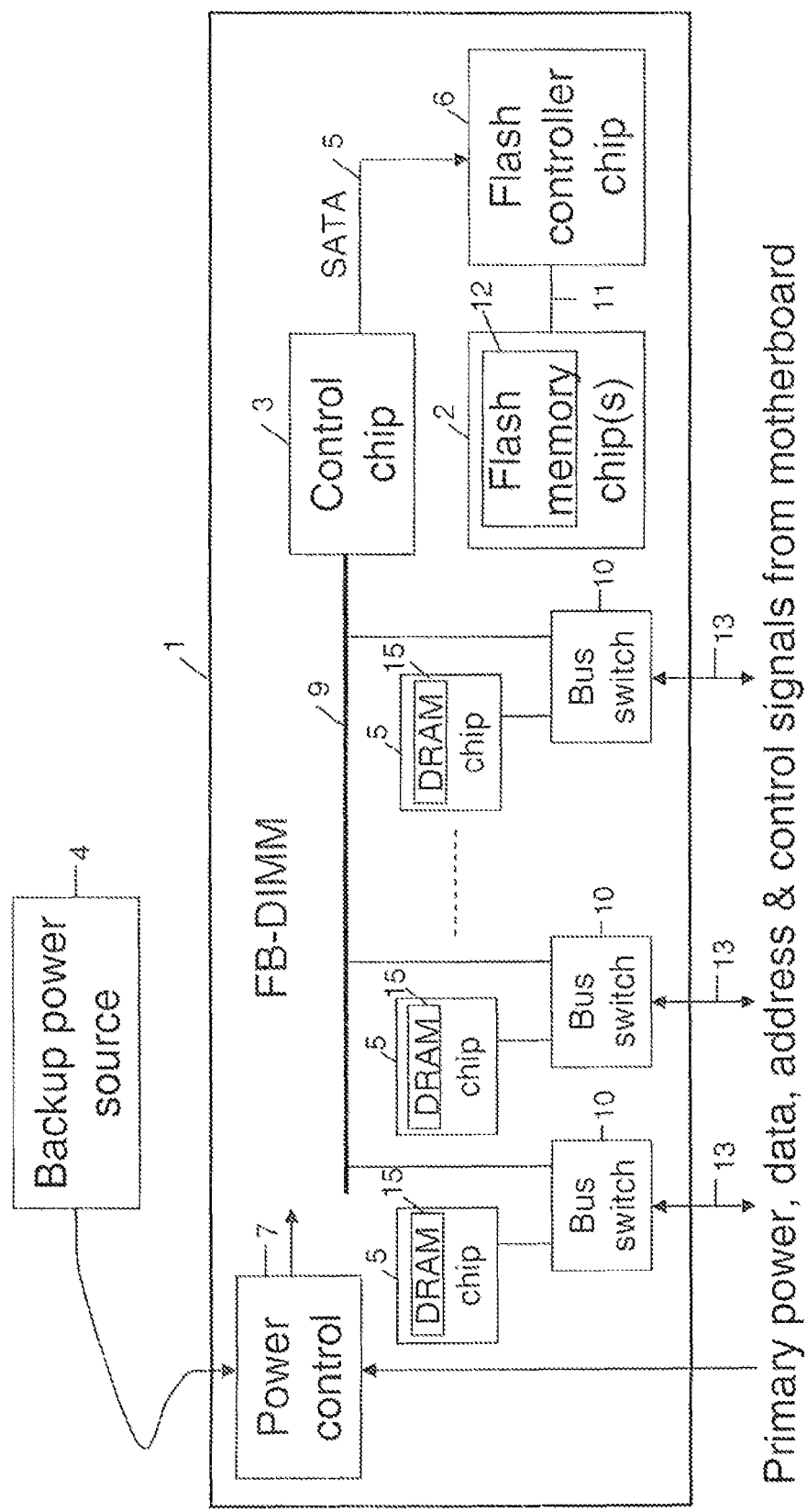
FIG. 1 schematically depicts a known architecture of a Non-Volatile DIMM.
Figure 3:
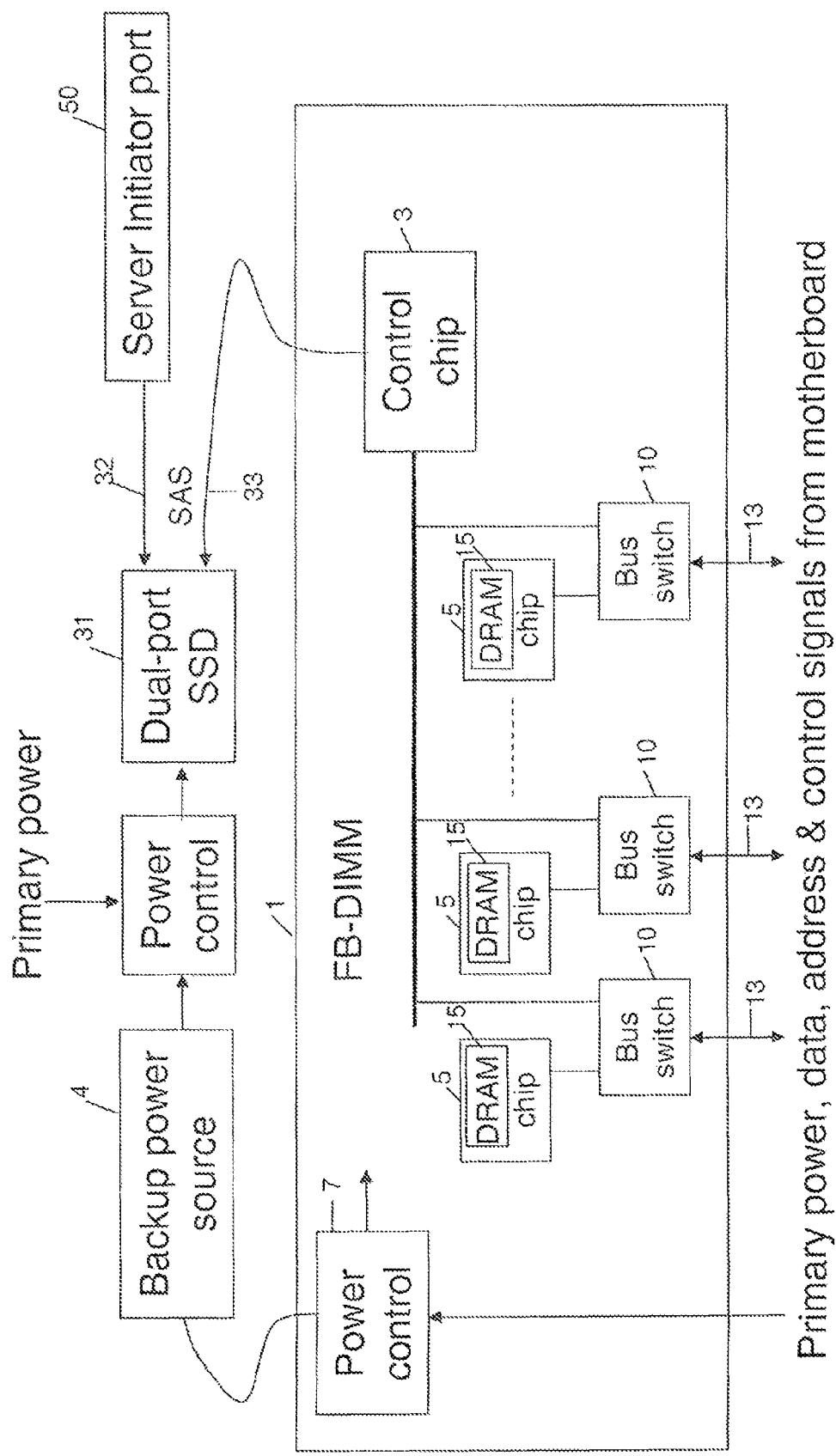
FIG. 3 shows a modified DIMM with an initiator-mode disk interface.
Figure 4:
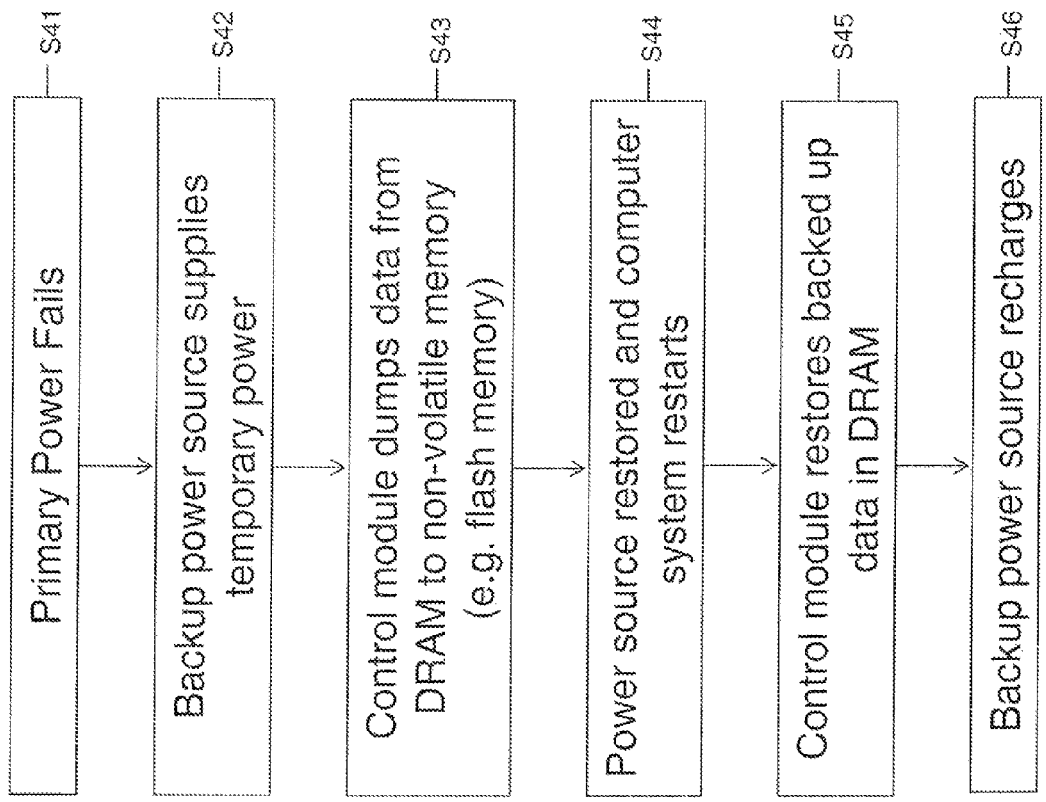
FIG. 4 shows a block diagram of operations according to the architecture of FIG. 1.

FIG. 3 shows an alternative embodiment of a modified DIMM 1 according to the invention. In this embodiment, the non-volatile storage is an external storage such as, for example, a standard Solid-State Disk (SSD) 31, which can either replace or supplement the Flash controller 6 and the Flash memory module 2 of FIG. 1. In the embodiment shown by way of example in FIG. 3, the Flash memory is omitted from the DIMM and an external storage drive is used for backing up data that was initially stored in the DRAM. This embodiment advantageously frees up scarce physical space on the DIMM which can then be used for inserting additional DRAM modules. There is provided an external SSD for each DIMM. If using SAS, a SAS expander could be used to share a single external disk between multiple NV-DIMM's. FIG. 5 illustrates the main steps according to this embodiment of the invention.

Referring to FIG. 5, when the primary power source of the computer system fails (S51), the Backup power source supplies power for a short period (step S52) and the control module 3 stores the data from the DRAM 15 to the SSD 31 (step S53). When power is restored, and after the computer system reboots (step S54), the controller software starts (S55). The controller software acts as an initiator for reading persistent backed up data in the SSD, and said controller software allocates memory space in the DRAM 15 (volatile storage) and writes the data into the DRAM 15 (step S56). It is the controller software running on the server which controls the restore operation for taking backed up data and storing it into the DRAM 15, instead of the Control Module 3 as in the backup operation. Finally, the backup power source recharges (S57). Having an external non-volatile disk, such as the SSD 31, advantageously saves space on the DIMM 1 and so reduces the need to incur the cost of additional system memory. Data transfer between the volatile memory and the external non-volatile storage is executed through a SAS interface for example. A Serial Attached Small Computer System Interface (SAS) is suitable for connecting an external storage drive to the DIMM 1. A dual port SSD is particularly suitable as an external non-volatile storage, and can receive commands from the server 50 via a first port 32 and commands from the DIMM's control module 3 via a second port 33. In this case, the DIMM does not require a SATA port selector and the external SSD 31 is directly connected to the control module 3 of DIMM 1 via the SAS interface. The other SSD port 32 is connected to the server initiator port 50. The SSD 31 can also be used to boot the storage controller. This also provides the aforementioned advantage that the Power-On Self-Test (POST) routines run during step S55 before the controller software starts in step S56. Hence, the risk of overwriting restored data on the DIMM during POST is eliminated.

In an example not illustrated by any figure, the external non-volatile storage, for example the Solid State Disk, can be connected to the control module via a SATA or SAS interface or any other interface capable of executing a transfer of control signals and data between a volatile memory and the non-volatile storage.

The system is configured to ensure that the controller software is one of the first programs to run after the operating system boots and POST processing has completed.

If the server is configured with both regular DIMMs and Non-Volatile DIMMs 1, the controller software advantageously reserves as much of the available memory as possible in the Non-Volatile DIMM 1 when the computer system has rebooted and is about to restore persistent data to volatile memory. The controller software should immediately allocate one memory block after another until there is no more memory available. The controller software advantageously checks the physical address of each memory block and releases those blocks that do not correspond to a Non-Volatile DIMM which it does not need. Finally, upon completion of the restoration of persistent data from the non-volatile storage to the DRAM 15, the controller software ensures that the persistent data is stored in the DRAM 15 on the Non-Volatile DIMM 1.

In further embodiment, when a computer system has a plurality of Non-Volatile DIMMs on its motherboard, one initiator port in the computer system can access the plurality of Non-Volatile DIMMs via an external multiplexer. The multiplexer can be a SATA port multiplier connecting a SATA initiator port in the computer system to a Flash controllers in respective Non-Volatile DIMMs. Alternatively, it is possible to use a plurality of initiator ports to read several Non-Volatile DIMMs, each port being used to read a respective Non-Volatile DIMM. Typical server computer systems have at least 6 SATA ports.

According to a further aspect of this embodiment, it is also possible to combine a plurality of initiator ports and a plurality of external port selectors to read the plurality of Non-Volatile DIMMs from said plurality of ports. According to this embodiment, the invention advantageously provides that each Non-Volatile DIMM 1 is adapted to be read via at least one initiator (e.g SATA initiator) on the computer system without causing any change to the computer system. However, typical mid-range controllers have only 1 or 2 DIMM's, so a server SATA port can be dedicated to each DIMM.

In an embodiment, when the Non-Volatile DIMM has an internal non-volatile storage such as a Flash memory thereon and is further connected to an external non-volatile storage via an SAS interface, data can be saved in priority from the volatile storage (e.g., DRAM) to the internal non-volatile storage and then to the external non-volatile storage. In this case, the internal non-volatile storage is used as a first priority during backup, and the external non-volatile storage is used when memory space is exhausted in the internal non-volatile memory. If both internal and external storage are used to save data when the power source has failed, subsequent restoration of data from the non-volatile memory to the volatile memory will correspond to restoring data saved across both internal and external non-volatile storage. Alternatively, data can be saved in priority from the volatile memory to the external non-volatile storage. In this case, it is unlikely that memory space shortage would occur due to usually higher memory capacity of external disks. If space shortages occur in the external non-volatile storage during backup, the remaining data can be backed up in the internal non-volatile storage. The subsequent restoration of data will take place from both internal and external storage to the volatile memory of the Non-Volatile DIMM. The external non-volatile storage can be an external SSD or another conventional mass storage device connectable to the Non-Volatile DIMM via the external disk interface In further examples and in accordance with any of the previous embodiments, the volatile memory of the Non-Volatile DIMM 1 can be a Random Access Memory (RAM) or any other volatile memory unit or a combination of such volatile memory. The non-volatile storage for backing up data stored in the volatile memory of the Non-Volatile DIMM 1 can consist of other types of memory such as Ferroelectric RAM, Magnetoresistive RAM, Electrically Erasable Programmable Read-Only memory (EEPROM), or phase-change memory. It will be apparent to a skilled person that the previous list is neither restrictive nor exhaustive.

Although various embodiments of the invention have been described above with reference to a Non-Volatile DIMM, it will be understood that the Non-Volatile DIMM may refer to any memory device capable of being operatively connected to a computer system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method of controlling data transfers between a volatile memory and a non-volatile storage, the volatile memory being on a memory device operatively coupled to a computer system, the method comprising:
   storing persistent and non-persistent data from the volatile memory to the non-volatile storage in response to a failure of a primary power source of the computer system; and,
   following re-establishment of a primary power source, selectively restoring only persistent data from the non-volatile storage to the volatile memory after completion of Power-On Self-Test (POST) operations, wherein the selective restoring only persistent data from the non-volatile storage to the volatile memory comprises restoring to the volatile memory less than a total of the persistent and non-persistent data stored to the non-volatile storage.

2. The method as claimed in claim 1, wherein the storing of data to non-volatile storage in response to a power failure is initiated by a hardware control module of the memory device, and the selective restoring of data is initiated by a storage controller computer program that is configured to be loaded into computer system memory and executed following re-establishment of a primary power source.

3. The method as claimed in claim 2, wherein following completion of POST operations and before the restoration of data, the storage controller computer program requests allocation of memory space in the volatile memory for restoring persistent data from the non-volatile storage to the volatile memory.

4. The method as claimed in claim 2, wherein the memory device comprises an external connection interface for receiving commands from the storage controller computer program.

5. The method according to claim 4, wherein the external interface is implemented by a multiplexer on the memory device.

6. The method according to claim 1, wherein the non-volatile storage comprises at least one flash memory module of the memory device.

7. The method as claimed in claim 1, wherein the non-volatile storage comprises storage that is external to the memory device, and wherein the memory device has an external interface for connecting said non-volatile storage to the memory device.

8. The method as claimed in claim 1, wherein the memory device is a Dual In Line Memory Module (DIMM).

9. The method as claimed in claim 1, wherein storage controller software selectively restores the data by reading said data stored in the non-volatile storage, identifying persistent data by reference to a list of pages containing persistent data, and writing the contents of the pages of persistent data to the volatile memory.

10. A method as claimed in claim 7, wherein the non-volatile storage comprises a solid state storage drive.

11. A method as claimed in claim 7, where the external interface includes a Serial Attached SCSI interface.

12. A method as claimed in claim 1 wherein the volatile memory includes at least one Dynamic Random Access Memory (DRAM) module.

13. A method as claimed in claim 1, wherein the computer system comprises at least one memory device which is a Non-Volatile Dual In Line Memory Module, and at least one memory device which is not a Non-Volatile Dual In Line Memory Module, and wherein storage controller software initially requests the operating system to allocate as much memory as possible for performance of a restore operation, irrespective of whether the memory resides on a Non-Volatile DIMM or not.

14. A method according to claim 13, wherein the storage controller program then releases any memory which it does not need and which does not reside on a Non-Volatile Dual In Line Memory Module.

15. A computer system comprising non-volatile storage and comprising at least one memory device having volatile memory thereon; wherein each memory device comprises a hardware control module for backing up data from the volatile memory to non-volatile storage in response to a failure of a primary power source; and wherein the system further comprises a controller component for initiating a selective restore of only persistent data from the non-volatile storage to volatile memory after completion of Power-On Self-Test (POST) operations following re-establishment of a primary power source, wherein the selective restore of only persistent data from the non-volatile storage to the volatile memory comprises the restore to the volatile memory of less than a total of the persistent and non-persistent data stored to the non-volatile storage.

16. A computer system according to claim 15, wherein the controller component for initiating a selective restore of persistent data comprises a storage controller computer program that is loaded into computer system memory and executed after completion of POST processing.

17. A computer program product for controlling a restore operation, following a failure and subsequent re-stablishment of a primary power source, the restore operation transferring data from a non-volatile storage to a volatile memory of a memory device, which memory device is operatively coupled with a computer system, wherein the computer program product comprises a non-transitory computer-readable storage medium having computer-readable program code recorded thereon, the computer-readable program code configured to selectively restore only persistent data from the non-volatile storage to the volatile memory device after completion of Power-On Self-Test (POST) operations, wherein the program code to selectively restore only persistent data from the non-volatile storage to the volatile memory device is further configured to restore to the volatile memory less than a total of the persistent and non-persistent data stored to the non-volatile storage.

* * * * *